April 14, 1931. J. H. BUTLER 1,800,777
MOTOR VEHICLE BODY
Filed Jan. 27, 1930 2 Sheets-Sheet 2

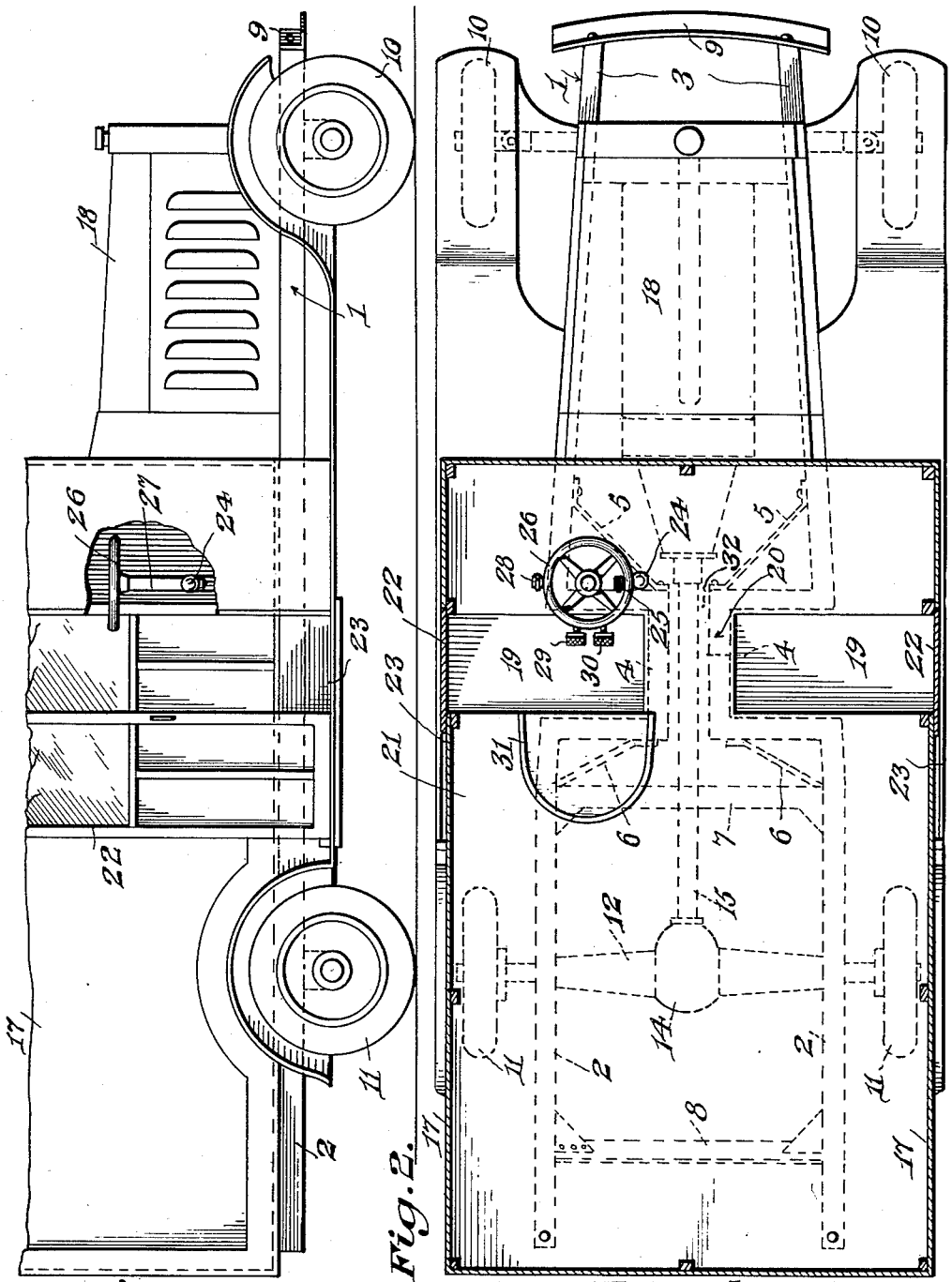

Jay H. Butler, Inventor
By C.A.Snow &Co.
Attorneys.

Patented Apr. 14, 1931

1,800,777

UNITED STATES PATENT OFFICE

JAY H. BUTLER, OF NEWARK, OHIO

MOTOR-VEHICLE BODY

Application filed January 27, 1930. Serial No. 423,794.

This invention aims to provide a delivery truck, adapted to be embodied in any make of automobile whatsoever, the device being so constructed that an operator can get into the vehicle quickly, handle his merchandise, and perform the operations of steering and controlling the vehicle from a standing posture.

Another object of the invention is to improve the construction of the vehicle frame or chassis.

It is within the province of the disclosure to improve generally and to enhance the utility of devices of that type to which the present invention appertains.

With the foregoing and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:

Figure 1 shows in side elevation, a device constructed in accordance with the invention, parts being broken away;

Figure 2 is a horizontal section wherein most parts appear in top plan;

Figures 4, 5:
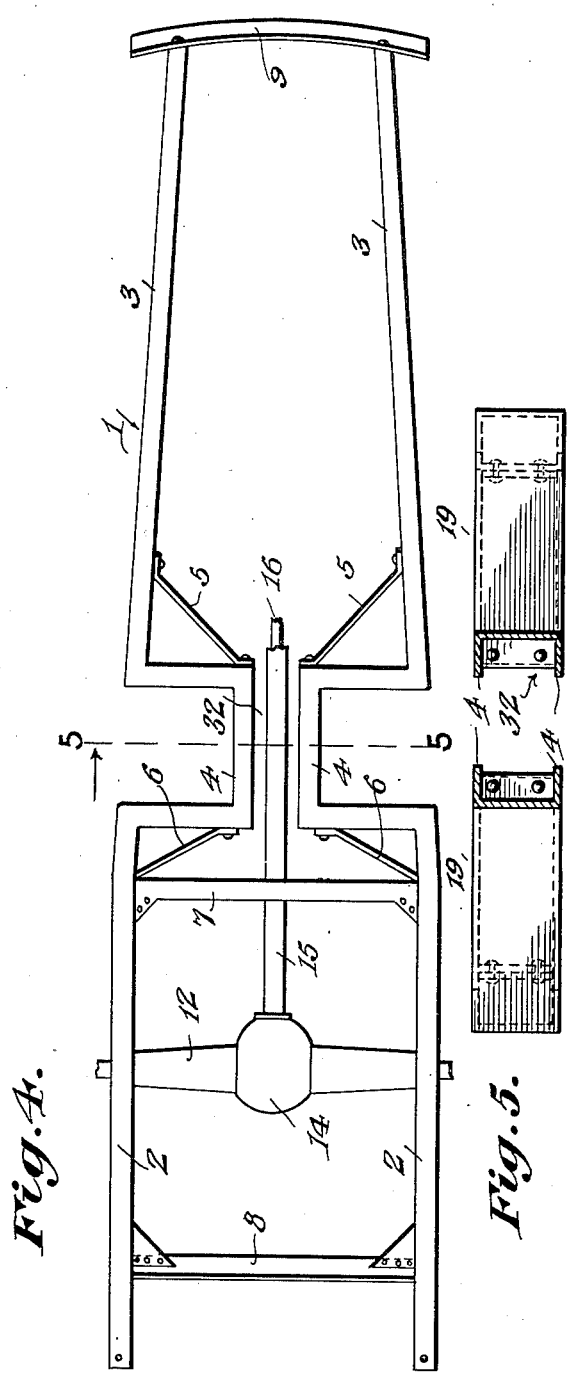
Figure 4 is a top plan view of the vehicle frame.
Figure 5 is a transverse section on the line 5—5 of Figure 4.

The frame of the vehicle is shown in Figure 4 of the drawings and is marked generally by the numeral 1. It comprises parallel rear portions 2 and converging front portions 3, each of the rear portions 2 being connected to one of the front portions 3 by inwardly extended, horizontal, U-shaped parts 4 defining a restricted space 32. The forward parts of the U-shaped members 4 may be connected with the portions 3 of the frame 1 by inclined braces 5, and inclined braces 6 may connect the rear portions of the parts 4 with the rear members 2 of the frame 1. The rear portions 2 of the frame 1 are connected, immediately behind the braces 6, by an intermediate cross bar 7. Near to their rear ends, the rear portions 2 of the frame 1 are connected by a rear cross bar 8. The front portions 3 of the frame 1 are connected at their forward ends by a front cross bar 9, which may be a bumper.

The front wheels are marked by the numeral 10, and are mounted in the usual way, for steering the vehicle. The rear axle housing 12 is connected, as usual, to the frame 1, and the rear wheels 11 are driven by the usual means, comprising a differential 14 and a drive shaft 16, the shaft 16 turning in a casing 15 of tubular form, the casing 15 for the drive shaft 16 passing through the reduced space 32 between the inner ends of the U-shaped parts 4 of the side bars of the frame 1.

The vehicle body 17 is mounted on the frame 1, as is the engine hood 18. The floor of the vehicle body is designated by the numeral 21, and in it is located a depressed passage-way 19 that extends entirely across the vehicle from side to side, the passage-way, however, including an arched portion 20 of small extent, that bridges the space 32 and extends over the casing 15 for the drive shaft 16. The arched portion 20 extends downwardly along the inner ends of the parts 4 of the frame 1, the passage-way 19 preferably being somewhat deeper than the vertical height of the frame 1, as Figure 3 will show.

The doors 22 that give access to the ends of the transverse passageway 19 may be mounted in any desired way. As shown in the drawings, they are mounted at 23 for sliding movement longitudinally of the vehicle. Some may wish to mount the doors otherwise than as shown, and it may be preferred to dispense with the doors entirely, all of which is permissible, within the spirit of the invention.

The gear shift lever 24 is mounted on the floor 21 of the vehicle body 17, at the left hand side of the vehicle, and in front of the transverse passage-way or well 19. The emergency brake lever 25 is located just to the left of the gear shift lever 24, looking toward the front of the vehicle, as shown in Figure 3.

The column 27 for the steering wheel 26 is located to the left of the emergency brake lever 25. The service brake lever 28 is disposed to the left of the column 27. The clutch pedal 29 and the service brake pedal 30 are mounted in the front wall of the passage-way 19, at the left hand side of the vehicle, to the rear of the steering column 27, and below, as disclosed in Figure 3 of the drawings. A seat 31 may be mounted on the floor 21, behind the passage-way 19, and to the rear of the steering wheel 26, although some persons may prefer to dispense with the seat 31 and operate the vehicle from a standing position.

The general construction of the device is such that an operator can step into the passage-way or well 19 quickly to get his merchandise, the vehicle being controlled readily from the left hand end of the passage-way 19.

Figure 3:
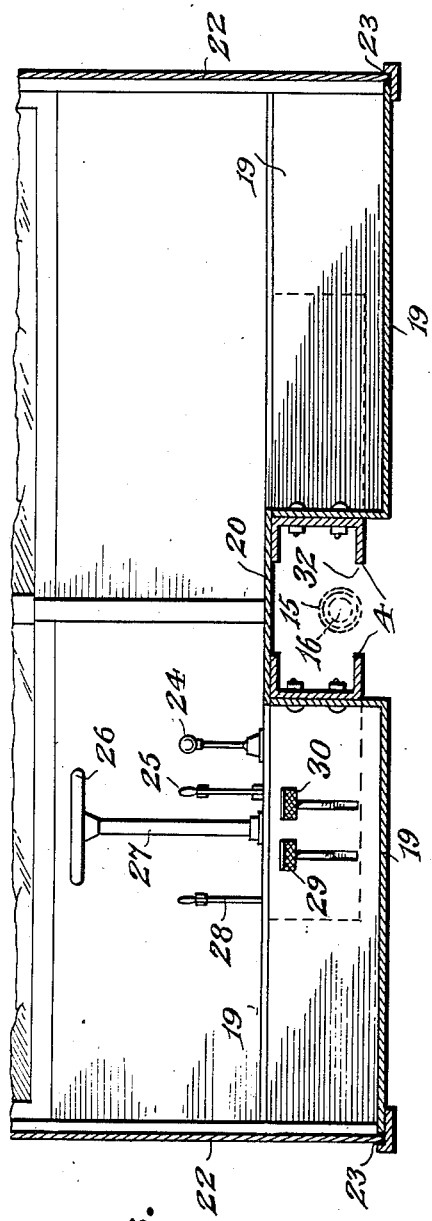
Figure 3 is a transverse section taken through the well or passageway.

The U-shaped parts or jogs 4 in the frame take the frame over close to the casing 15 for the drive shaft 16, in order that the vehicle body, constructed as shown in Figure 3, may be mounted readily on the frame, it being possible for the driver to pass through the body from side to side, by way of the passage-way 19, by simply stepping over the arched portion 20, which is an obstruction so small as to cause the driver no appreciable amount of inconvenience in passing through the vehicle from side to side.

The device comprises a complete set of controls which may be operated whilst the operator is standing, mechanism being provided for operating the steering gear, the device comprising a gear shift lever, a clutch and brake pedal combined, an independent brake, and also an emergency brake lever and a lever to control the clutch and brake pedals. The service brake lever holds the clutch released and the brake set, whilst the truck is standing still, and the truck can be left in gear, with the motor running, these being matters of machine design which it is not necessary to show in the present drawings, the said drawings relating to the body and frame construction.

As to the parts 4 or jogs in the frame, no specified dimensions are given, since some vehicle frames are wider than others. The jogs 4 can be made to suit the size of the frame.

It is to be understood that the device forming the subject matter of this application can be used on any make of automobile whatsoever.

The invention provides a novel means whereby a motor vehicle, of any desired make whatsoever, can be used readily as a low-down type of delivery truck, by altering the frame, and installing the controlling mechanism 24—25—26—28—29—30, as shown in the drawings, and in a properly constructed body of the sort shown and illustrated.

What is claimed is:—

1. In a vehicle of the class described, a frame having side portions provided with inwardly extended U-shaped parts forming a reduced space adjacent to the longitudinal central line of the frame, rear wheels carrying the frame, means for driving the wheels, including a longitudinal shaft extended through said space, and a body on the frame, the body comprising a transverse well extended across the vehicle from side to side, the well embodying a narrow, arched portion bridging said space and covering the drive shaft, the arched portion of the well extending between the inner ends of the said U-shaped parts of the frame.

2. In a vehicle of the class described, a frame having side portions provided with inwardly extended U-shaped parts forming a reduced space adjacent to the longitudinal central line of the frame, rear wheels carrying the frame, means for driving the wheels including a longitudinal shaft extended through said space, a body on the frame, and including a floor, the body comprising a transverse well extended across the vehicle from side to side, the well embodying a narrow, arched portion bridging said space and covering the drive shaft, the arched portion of the well extending between the inner ends of the said U-shaped parts of the frame, and vehicle-controlling means mounted on the floor in front of the well and on the front wall of the well at one side of the arched portion.

In testimony that I claim the foregoing as my own, I have hereto affixed my signature.

JAY H. BUTLER.